Patented Jan. 2, 1951

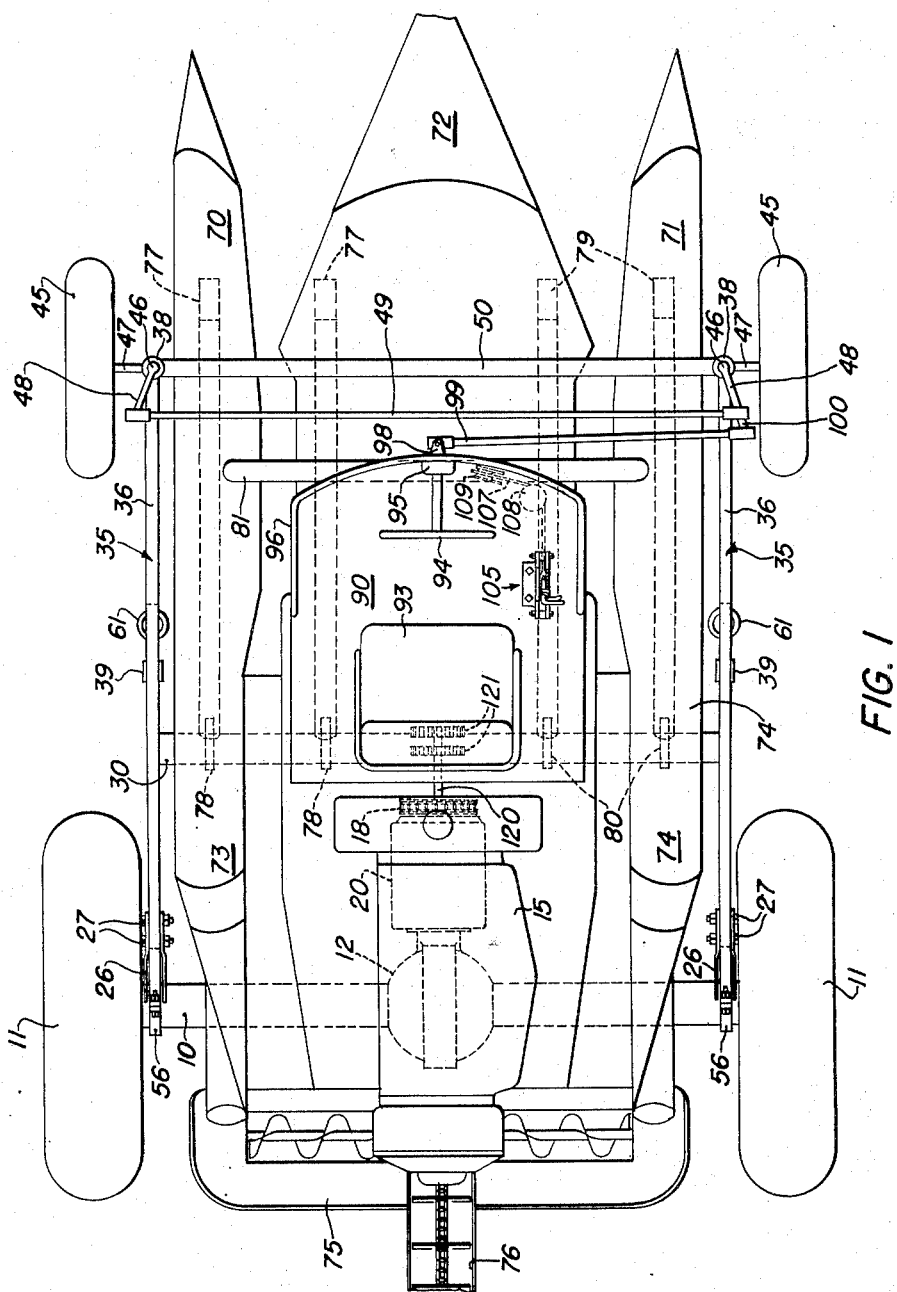

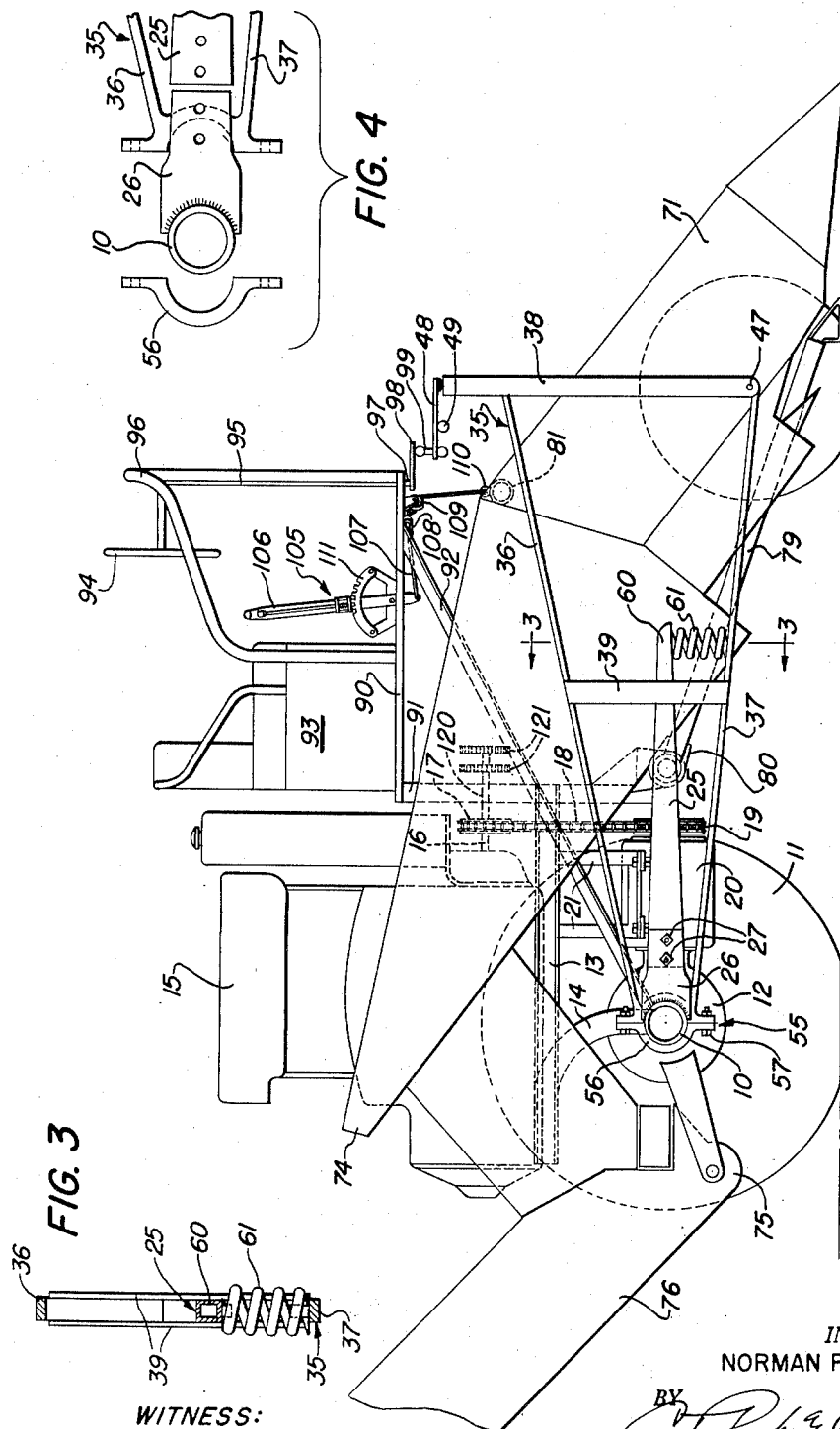

2,536,411

UNITED STATES PATENT OFFICE 2,536,411

SUSPENSION FOR VEHICLES ESPECIALLY FOR AGRICULTURAL PURPOSES

Norman F. Andrews, Moline, Ill., assignor to Deere & Company, Moline, Ill., a corporation of Illinois Application October 16, 1947, Serial No. 780,242

8 Claims. (Cl. 280—124)

This invention relates to an agricultural vehicle and particularly to improvements in agricultural vehicles of the self-propelled type that are especially adapted for carrying or mounting agricultural machines of the harvester type, such as corn pickers, combines and the like.

In ordinary circumstances the usual agricultural tractor is an ideal vehicle for the purpose of carrying agricultural implements. In the case of implements or machines of the harvester type, such as corn pickers or combines, special provision must be made for adapting such machines to the tractor. In many cases the supporting structure is so complicated as almost to require a separate tractor for use with the attached machinery and another tractor for general utility purposes. This is particularly true in the cases where the volume of crops to be harvested is quite large. However, the expenditure of funds for a tractor especially for the purpose of carrying the combine or corn picker is not warranted in view of the fact that the entire machine may be provided as a self-propelled unit. Where this expedient is resorted to the final product can be had at a much lower cost, inasmuch as the self-propelled vehicle need not include all the structural and functional characteristics of a tractor. For example, the same may be simply and inexpensively constructed and may be especially fabricated for the purpose of carrying a particular type of implement, in which case structural parts of the vehicle may be employed as structural parts of the implement or machine itself, thus leading to relatively large savings in cost.

Self-propelled units of the type referred to have not in the past been eminently successful, for various reasons. One of the difficulties encountered in the design and manufacture of such units is that attendant upon the provision of a frame structure that is sufficiently rigid to carry the machine and at the same time that is sufficiently flexible to accommodate operation of the machine over varying ground contours. It is accordingly one of the principal objects of the present invention to provide an improved self-propelled agricultural machine in which the frame structure includes provision allowing for flexibility between interconnected parts of the frame whereby the unit accommodates itself to changes in terrain, such flexibility being obtained without sacrificing any of the structural strength of the framework. Specifically, this object is achieved by the provision of a pair of articulately interconnected frame sections, one of which includes means for carrying an agricultural machine of the harvester type, such as a corn picker or combine. It is another object of the invention to provide means on one of the frame sections for carrying an agricultural machine and to provide for the carrying of such machine in such manner that the harvesting part may be movable vertically with respect to both of the frame sections, thereby permitting flexibility of the frame sections and at the same time providing for vertical adjustment of the harvester part.

Another feature of the invention relates to the means by which the frame sections are articulately interconnected, this means employing hinge or pivot means for connecting the two sections, in addition to which resilient means is provided for supporting part of the weight of one frame section on the other frame section. A related feature pertains to the cross bracing of one of the frame sections and further to the provision on that frame section of dirigible or steerable wheel means.

The invention includes further provision relating to the mounting of the power means for the vehicle and mounting of the operator's station, particularly the mounting of the latter upon one of the frame sections independently of any connection with the other frame section, whereby relative movement between the frame sections when one section moves relative to the other in response to variations in ground contour will not adversely affect the position or comfort of the operator.

Other objects inherent in and encompassed by the invention will become apparent to those skilled in the art after the disclosure is more fully made of the preferred embodiment of the invention in the following detailed description and accompanying sheets of drawings, in which Figure 1 is a plan view of an agricultural vehicle of the type referred to shown in connection with a harvester of the corn picker type;

Figure 2 is a side elevational view of the same, the near wheels being removed;

Figure 3 is an enlarged transverse sectional view taken substantially along the line 3—3 of Figure 1 and showing the weight transfer or load supporting means between the front and rear frame sections; and Figure 4 is an exploded fragmentary view, on an enlarged scale, showing the manner in which the frame sections are connected at their rear end portions.

Although the present disclosure is based upon the use of the invention in connection with a harvester of the corn picker type, it should be understood that the invention has wider adaptability and may in fact be used with other harvesters or other agricultural machines or implements. Accordingly, the disclosure should be taken as illustrative and not limiting.

Rear frame section

This part of the vehicle includes a transverse rear axle structure 10 carried at its opposite ends on ground-engaging means in the form of wheels 11. The axle structure includes intermediate its ends a gear housing 12 for the purpose of housing differential drive mechanism (not shown) which may be of any conventional construction. A fore and aft motor supporting frame 13 is disposed above the axle housing 10 substantially above the gear housing 12 and is suitably supported thereon by braces 14, only one of which is shown in Figure 2. The motor supporting frame 13 carries thereon a power plant 15 which is here illustrated as an internal combustion engine. In the type of engine illustrated the crank shaft includes a forwardly extending connecting shaft, here designated as a power shaft 16. This shaft comprises part of a power transmission means for the transmitting of power of the engine to the drive axles (not shown) contained within the rear axle housing 10 and connected to the driving wheels 11 in the usual manner.

The power transmitting means further includes a drive sprocket 17 keyed to the drive shaft 16 and connected by a driving chain 18 to a sprocket 19 keyed on a shaft (not shown) which is part of a change speed transmission (not shown) contained in a transmission housing 20. The change speed mechanism may be connected in the conventional manner to the differential driving mechanism contained in the differential gear housing 12. The change speed gear housing is supported, preferably by suspension, from the motor frame 13 by means of depending hangers 21 (Figure 2).

The rear frame section is provided generally as a rigid U-shaped frame construction in which the bight of the U is represented by the transverse axle structure 10 and in which the legs of the U comprise a pair of laterally spaced longitudinally forwardly extending frame arms 25. These arms are of cantilever design as respects the remainder of the vehicle construction, as will appear later. Each arm 25 is rigidly secured to the transverse axle structure 10 preferably by means of the parts shown in Figures 2 and 4. The axle structure 10 includes at each of its opposite ends, just inwardly of the proximate traction wheel 11, a pair of forwardly extending brackets 26 which are secured to the axle structure, preferably by welding. Each pair of brackets receives therebetween the rear end of the cantilever arm 25, the arm and the bracket being suitably apertured to receive attaching bolts 27. The arms are preferably constructed in a manner that will permit the removal thereof from the brackets 26, for the purpose of accommodating the connection of parts of the front frame section, as will appear below. The forward end portions of the arms 25 are disposed in substantial transverse alinement at a point relatively far ahead of the forward portion of the motor supporting frame 13. In the presently disclosed form of the invention the arms 25 are preferably horizontal and are cross connected by a transverse implement attaching member 30. This member is preferably in the form of a tube and may be connected at its opposite ends in any suitable manner to the arms 25. The connection between the arms 25 and transverse tube 30 is disposed somewhat rearwardly of the forward end portions of the arms 25 (Figures 1 and 2).

Front frame section

The front frame section is provided with a pair of laterally spaced longitudinally extending side frame elements designated generally by the numeral 35. Each frame element is preferably of triangular construction having its apex portion in proximity to the rear axle structure 10 and including upper and lower frame members 36 and 37, respectively, diverging forwardly to a vertical frame member or standard 38. The upper and lower frame members are suitably cross connected by a pair of laterally spaced vertical braces 39 (Figure 3). The members 39 embrace and provide vertical guides for the side arms 25 of the rear frame section. The front frame section is carried on a pair of laterally spaced, individual ground-engaging means in the form of dirigible or steerable wheels 45 and each standard 38 journals a vertical spindle 46 at the lower end of which is connected a short axle 47 for carrying the proximate wheel 45. The upper end of each spindle includes a suitable steering link 48 and the arms 48 are suitably cross connected by a tie rod 49. The upper ends of the standards 38 are rigidly cross braced by a transverse member 50 which is disposed at a level considerably higher than the level of the transverse implement attaching tube 30. The purpose of this relationship between the frame members will be made apparent subsequently.

The rear or apex end of each side frame element 35 is preferably provided with a split bearing indicated in its entirety by the numeral 55. The bearing includes a front half that is preferably formed rigidly with the upper and lower frame members 36 and 37 and the rear portion of the bearing, designated by the numeral 56, is a removable element forming a complementary half of the bearing. As shown in Figure 4, the removable halves 56 of the bearings 55 may be separated from the bearing portions carried by the arms 35, this construction providing for the ready assembly of the frame section and permitting quick and easy connection of the arms 35 to the rear axle housing or structure 10. Each bearing half 56 may be suitably secured to the proximate bearing portion as by means of a plurality of bolts 57.

In the type of connection shown, the apex ends of the frame elements 35 fit between the proximate pair of brackets 26, and the arrangement is such that the apertured portions of the brackets 26 are ahead of the bearing portion, so that the rear end of the rear section frame member or arm 25 may be readily connected thereto.

The front section just described may thus be spoken of as a generally U-shaped frame in which the transverse member 50 provides the bight and the rearwardly extending frame elements or arms provide the legs. The connections between the transverse member 50 and the vertical standards 38 are preferably rigid to provide for the transverse spacing of the wheels 45; however, the connection and the relationship of the length of the member 50 are such that the member can flex as the wheels 45 independently follow varying ground contour.

The rear section and front section are interconnected in a manner providing for the supporting of the weight of part of the rear section on the front section. For this purpose the respective arms 35 and 25 include portions in close proximity. In the form of the invention shown, the forward ends of the arms 25 extend somewhat beyond the mid-point of the arms or elements 35, the forward end of each arm being designated by the reference numeral 60. This portion of each frame arm 25 passes through the vertical guide 39 on the proximate frame element 35. Each portion 60 is spaced vertically above the lower frame part 37 of the proximate element 35 and a coil spring 61 is interposed between the under portion of the arm part 60 and the element part 37, this means providing a resilient supporting connection between the arms 25 and 35. In this manner the weight of the rear section is carried in part on the traction wheels 11 and in part on the front frame section by means of the resilient connections 61, and the arrangement permits the rise and fall of each side of the front frame section as the wheels 45 and 11 encounter varying ground contours. The design provides for desirable flexibility of the vehicle frame during operation, at the same time incorporating features of design contributing to the rigidity and durability of the unit. The relationship of these structural characteristics to the remainder of the unit will be set forth below.

*Implement, operator's station, controls, and drive*

The implement chosen for the purposes of the present disclosure is a harvester of the two-row corn picker type having a left hand picker unit 70 and a right hand picker unit 71, each of which is associated with a common central unit 72. The illustration of the picker is somewhat diagrammatic, inasmuch as general details may vary widely and several types of picker units are well known to those skilled in the art. The adaptability of the vehicle to any existing type of picker unit is one of the important features of the invention. For the purposes of the present disclosure it is believed necessary to refer to the picker structure only generally.

The left hand picker unit is associated in the usual manner with a first elevator 73 which extends longitudinally rearwardly just inside the left hand traction wheel 11 and over and rearwardly of the left hand portion of the rear axle structure 10. The right hand picker unit 71 is similarly associated with a first elevator 74 which is similarly related to the right hand traction wheel 11 and right hand portion of the rear axle structure 10. Both the first elevators discharge at their rear ends into a common transverse hopper 75 with which is associated in the usual manner a rearwardly and upwardly inclined wagon elevator 76.

The left hand picker unit includes a pair of longitudinally forwardly extending frame or supporting members 77, each of which is connected at its rear end to the transverse implement attaching pipe 30 as at 78. The connection 78 is such as to provide for vertical movement of the supporting frame members 77 about a transverse axis, preferably the transverse axis of the pipe 30. The right hand picker unit 71 includes similar supporting or frame members 79 which are connected at 80 to the implement attaching pipe 30, the connection 80 including the same provision as the connection 78. The first elevators 73 and 74 are respectively supported on the picker or implement frames 77 and 79 in such manner that the elevators are relatively rigid with respect to the respective picker units so that each unit is adjustable vertically about the transverse axis provided by the connections 78 and 80. This type of construction is well known to those skilled in the art and needs no further explanation or illustration. For the purpose of bracing the picker units 70 and 71 against departure from their lateral spacing a transverse brace 81 is provided across the forward portions of the picker units, this brace preferably comprising a tube secured at opposite ends to the picker units 70 and 71, respectively, and fastened to the shielding portion of the center unit 72, a construction which is also familiar to those skilled in the art.

In the present case, as is the case with most self-propelled units, the operator's station is located in a position such that will afford the operator a clear view of the field ahead and the operation of the machine below him. For this purpose the operator's station is disposed ahead of the power plant 15 and somewhat above the general level of the picker units. The operator's station includes a longitudinally forwardly extending platform 90 suitably supported at its rear end by means of vertical supports 91 having their lower ends carried by the transverse implement supporting part 30. This manner of supporting the operator's platform 90 is only illustrative, and any other suitable form of support may be utilized. The forward portion of the platform 90 is further supported on a pair of longitudinally rearwardly and downwadly extending frame elements 92, only one of which appears in the drawings. This manner of supporting the operator's station provides that the operator's station is a rigid or component part of the rear frame section and extends forwardly in cantilever fashion from the rear axle housing 10.

The operator's station may further include a seat, as at 93, which is disposed rearwardly of a steering wheel 94 carried on a vertical standard 95 which is enclosed by a guard rail 96 at the forward end portion of the platform. The support 95 for the steering wheel 94 may enclose suitable mechanism including a steering shaft 97 which extends below the operator's platform 90 (Figure 2). This shaft has secured thereto a forwardly extending steering arm 98 which is connected by a transverse drag link 99 to an extension 100 on the left hand steering arm 48 previously described. The steering arrangement here illustrated and described is of the automotive type and is found to be particularly adaptable for units of the present class; although, any other type of steering mechanism may be resorted to. The steering connections will of course include provision for desirable flexibility of the units while maintaining correct steering geometry, all of which will be obvious to those skilled in the art.

The picker units 70 and 71 may be raised or lowered about the transverse axis through the pipe 30 as provided by the connections 78 and 80, by means of lifting and lowering mechanism, indicated in its entirety by the numeral 105. This mechanism includes a fore and aft swingable hand lever 106 pivoted on the operator's platform 90 and having a portion extending below the platform and connected to a longitudinally forwardly extending cable 107. This cable is trained about a first sheave or pulley 108 located adjacent the right front corner of the platform 90 (Figure 1); the cable then extends toward the longitudinal center line of the unit and is trained about a second sheave or pulley 109 and then extends downwardly to a connection 110 on the transverse brace pipe 81 between the picker units 70 and 71. The lifting and lowering mechanism 105 further includes a quadrant 111 associated in the conventional manner with the lifting lever 106 for the purpose of locking the latter in any selected position of adjustment. The type of lifting and lowering mechanism illustrated is shown only by way of example and may be replaced by any other suitable type of mechanism.

The drive for the picker or whatever type of implement is mounted on the supporting member 30 may be, if desired, taken directly off the forwardly extending power shaft 16, and for this purpose there is illustrated a driving connection including an extension shaft 120 which projects longitudinally forwardly below the platform 90 and has keyed thereto a pair of driving sprockets 121. The particular driving mechanism has no specific relationship to the subject matter of the present invention except in so far as it is related to the general background disclosure of the units, and for this purpose details thereof have been omitted from the description and drawings, it being understood that the necessary connections may be made to the operating parts of the picker, combine, or whatever other type of implement is used, all of which is within the realm of those familiar with the type of units herein disclosed.

Summary

In achieving the objects and including the features of the invention as hereinbefore set forth, I have provided, by way of example, a preferred construction which is characterized by a pair of articulately interconnected frame sections so related as to be capable of supporting thereon an agricultural implement, preferably of the harvester type. The connection between the frame sections is such as to permit wide flexibility in the adaptation and use of implements. The entire construction is quite desirable from the standpoint of simplicity and economy, inasmuch as it provides a ready unit adapted especially for comparatively permanent use with harvesting machinery, thereby eliminating the need for an extra tractor. Inasmuch as the construction is relatively simple, the cost is considerably lower than that of a tractor and the tremendous advantages gained by the use of such unit instead of a tractor more than offset the additional cost of the unit; that is to say, the cost that would be in addition to purchasing the first tractor which would necessarily have to be used for the purpose of propelling a corn picker or combine of the modern type, which arrangement, as hereinbefore set forth, is subject to the great disadvantage that the particular implement must be dismounted from the tractor to permit use of the tractor in other operations.

The structural details involved in the preferred design have been chosen for the purposes of providing a vehicle unit having a relatively wide tread and a wheel base accommodating the unit to the carrying of harvesting machinery in particular. It should be understood, of course, that many variations may be made in the particular design and construction illustrated. It is therefore not intended to limit the invention by the precise details of the present disclosure or by the manner or form of the description with its reference to separate units or sections of the structural organization. For example, the use of the terms "front" and "rear" has been resorted to for the purposes of clarity and simplicity; it will be understood of course that the parts may be interchanged end for end without departing from the basic principles of the invention involved.

I claim:

1. An agricultural vehicle, comprising a wheeled rear frame section having rigid therewith a pair of laterally spaced, longitudinally forwardly extending cantilever arms; a wheeled front section including a pair of laterally spaced, longitudinally rearwardly extending frame elements having portions disposed respectively proximate to said cantilever arms, means hingedly connecting rear end portions of said frame elements to the rear section on a transverse axis; and means supporting the rear section on the front section including resilient means interposed respectively between each cantilever arm and its proximate frame element.

2. The invention set forth in claim 1, in which the cantilever arms are cross-connected by a transverse member which serves also as means for attaching an implement.

3. An agricultural vehicle having a longitudinal frame comprising a pair of generally U-shaped frame sections hingedly connected together, characterized in that: one frame section is a rear section in which the bight of the U is a transverse wheeled frame member and the legs of the U are both vertically and transversely rigid and extend forwardly in laterally spaced relation, the other frame section is a front section in which the bight of the U is a transverse wheeled frame member disposed ahead of the forward ends of the legs of the rear section and the legs of the U of the front section are both vertically and transversely rigid and extend rearwardly to laterally spaced portions of the rear section transverse member, means are provided for hinging the rear end portions of the front section legs to said portions of the rear section transverse member substantially on the transverse axis of said rear section transverse member, and a pair of individual, transversely alined resilient supporting means is provided for supporting the front portions of the rear section legs respectively on intermediate portions of the front section legs.

4. The invention set forth in claim 3, in which the legs of one section are cross-connected by a transverse implement-attaching member disposed rearwardly of the transversely alined resilient means.

5. A self-propelled vehicle for carrying agricultural implements, comprising: a structural member disposed transversely as respects the line of travel of the vehicle and having traction means at each of its opposite end portions; a pair of transversely spaced apart ground-engaging means positioned forwardly of the transverse member, each ground-engaging means including a generally vertical member; a pair of laterally spaced apart side frame elements extending fore and aft between the transverse rear member and the vertical member, each including upper and lower members diverging forwardly in a longitudinal vertical plane from rear portions adjacent the transverse rear member to vertically spaced apart front portions on the proximate vertical member; pivot means on a transverse axis sustaining the rear portions of said side members on the transverse rear member; means sustaining the front portions of the side members on the respective vertical member; means associated with each side frame element including a longitudinal arm having a rear end portion rigidly connected to the rear transverse member and a front portion terminating short of the vertical spindle at that side and interposed between the upper and lower frame members, each arm being thereby movable vertically relative to its associated side frame element; and a pair of transversely alined resilient means, one for each side frame element and associated arm, for resiliently sustaining the arms respectively on the side frame elements.

6. The invention defined in claim 5, further characterized in that: each side frame element includes guide means cooperating with the respective arm to guide the element and associated arm in their relative vertical movement.

7. The invention defined in claim 5, further characterized in that: a transverse implement-carrying member is disposed ahead of the rear transverse member and behind the resilient means and is connected at its opposite end portions respectively to the arms.

8. The invention defined in claim 5, further characterized in that: a transverse member cross-connects the upper portions of the vertical members.

NORMAN F. ANDREWS.

REFERENCES CITED

The following references are of record in the file of this patent:

UNITED STATES PATENTS

| Number | Name | Date |
| --- | --- | --- |
| 641,096 | French | Jan. 9, 1900 |
| 859,516 | Pope | July 9, 1907 |
| 1,256,347 | Meharry | Feb. 12, 1918 |
| 1,737,160 | Johnston | Nov. 26, 1929 |
| 1,910,189 | Synck | May 23, 1933 |
| 2,152,273 | Otto | Mar. 28, 1939 |
| 2,333,080 | Aasland | Nov. 2, 1943 |